UNITED STATES PATENT OFFICE 2,634,276

METAL MOLYBDITE CATALYZED DECARBONYLATION OF FURFURAL TO FURAN

James E. Carnahan, New Castle, Del., assignor to E. I. du Pont de Nemours and Company, Wilmington, Del., a corporation of Delaware No Drawing. Application April 17, 1951, Serial No. 221,533

4 Claims. (Cl. 260—346.1)

This invention relates to catalytic decarbonylation reactions and more particularly to catalytic decarbonylation of furfural to furan.

It is an object of this invention to provide a novel catalytic method for the decarbonylation of furfural to furan. An important object is to provide a novel catalytic method for obtaining furan from furfural in good yields and with minimum of side-reaction products. Other objects will appear hereinafter.

The objects of this invention are accomplished by the following process for decarbonylating furfural to furan which comprises contacting furfural and water with a non-ferrous metal molybdite or a mixture of molybdites of ferrous metals whose ions are soluble in aqueous ammonia in amount greater than that stoichiometrically required to precipitate the metal ion. This invention provides a new and useful process for obtaining furan from furfural, which comprises effecting the decarbonylation of furfural in the presence of a non-ferrous metal molybdite, particularly a zinc or copper molybdite, or in the presence of a mixture of molybdites of ferrous metals whose ions are not precipitated as insoluble oxides or hydroxides when solutions of their salts are treated with excess aqueous ammonia. Such a mixture of ferrous metal molybdites is a mixture of nickel and cobalt molybdites.

In one embodiment of this invention, a catalyst chamber is charged with the molybdite catalyst and the catalyst heated to between 350° and 500° C. A vapor mixture of water and furaldehyde (furfural), in the ratio of at least 5 moles of water per mole of furaldehyde, is then passed over the heated catalyst at a velocity corresponding to between 2 and 500 gram-moles of vapor per liter of catalyst per hour. The products of reaction are collected in suitable traps and the collected product is then subjected to fractional distillation, or other means known to those skilled in the art, to isolate the desired product.

The examples which follow are submitted to illustrate and not to limit this invention.

Example I

A stationary-bed tubular reactor was charged with 95 ml. (131 g.) of copper molybdite catalyst prepared in 8:14 mesh granular form according to directions given subsequently. Furfural (96 g., 1.0 mole) and water (178 g., 9.9 moles) were vaporized by codistillation at uniform rate and passed through the catalyst at a temperature of 430±30° C. during a period of 3.3 hours. Nitrogen flowing at 8 liters per hour was used as carrier gas. The calculated vapor space velocity was 860 hr.$^{-1}$ and apparent contact time was 1.5 seconds. The effluent products were condensed in appropriate cold traps and separated by fractional distillation. Furan was obtained in 25% conversion and 43% yield. Unconverted furfural was recycled.

Example II

Example I was repeated except that zinc molybdite (85 ml., 143 g.) was employed as catalyst, and the process was conducted at 440±10° C. during 3.0 hours. The calculated vapor space velocity was 1140 hr.$^{-1}$ and the apparent contact time was 1.2 seconds. Furan was isolated in 18% conversion and 32% yield.

The examples have illustrated certain preferred embodiments of the invention. It is to be understood that variation therefrom may be had without departing from the scope or spirit thereof.

The catalysts used in the practice of this invention are the metal molybdites described in the copending application of H. R. Arnold and J. E. Carnahan, U. S. Serial No. 111,982 filed August 23, 1949, now U. S. Patent No. 2,572,300, issued October 23, 1951. These molybdites exist in two series, in the first of which the molybdenum is present in the quadrivalent state corresponding to the oxide $MoO_2$, and the hypothetical acid $H_2MoO_3$, and in the second the molybdenum exists in the bivalent state corresponding to the oxide $MoO$ and the hypothetical acid $H_2MoO_2$. Thus, zinc molybdite has the formula $ZnMoO_3$ and copper molybdite has the formulas $CuMoO_2$ and $CuMoO_3$.

The non-ferrous metal molybdites, particularly copper and zinc molybdites are the preferred catalysts. They may be used as such or they may contain modifiers or promoters such as iron, barium, cadmium, chromium, cobalt, nickel, etc., if desired, and they may be employed in the form of pellets or as finely divided powders. They may be used as such or extended on inert supports such as charcoal, alumina, silica, etc., or they may be mixed with metallic pellets, such as copper, iron, etc., pellets. The latter constitutes a particularly preferred form of using the catalysts because the pellets act as heat-dissipating media and in that way make it possible to exercise better temperature control on the reaction. The particular form of the catalyst for maximum activity depends upon the conditions under which the decarbonylation reaction is to be effected. Thus, for vapor or liquid phase continuous operation it is best to have the catalyst in the form of pellets, especially pellets mixed with metal turnings or pellets.

A typical preparation of copper molybdite usefully employable in the practice of this invention is the following:

Seventeen hundred sixty-six grams of ammonium paramolybdate, $(NH_4)_6Mo_7O_{24}.4H_2O$, equivalent to 10 moles of $MoO_3$, was dissolved in 5000 cc. of distilled water and neutralized by the addition of 900 cc. of 28% aqueous ammonia. The resulting solution of ammonium molybdate $(NH_4)_2MoO_4$ containing 1.9 moles excess ammonia was added with stirring, at room temperature, to a solution of cupric nitrate prepared by dissolving 2416 grams of cupric nitrate trihydrate, $Cu(NO_3)_2.3H_2O$, equivalent to 10 moles of the cupric salt, in 5000 cc. of distilled water. A pale green precipitate was formed in an acid slurry having a pH of approximately 3.9. The pH of the slurry was adjusted to 7 (Beckman pH meter) by the addition of 630 cc. of 28% aqueous ammonia. The precipitate was then washed, filtered, dried, and calcined at 400° C. for 24 hours. Analysis of the calcined product showed it to contain 29.7% copper and 37.7% molybdenum. The calcined product was reduced in 80 $N_2$/20 $H_2$ gas mixture at gradually increasing temperature up to 450° C. for a total of 26 hours, of which about 20 hours was at 450° C. The reduced product was pyrophoric on exposure to air. Analysis of the reduced material showed it to contain 34.45% copper and 49.10% molybdenum, corresponding closely to $CuMoO_2$.

In place of zinc and copper molybdites there can be used mixtures of molybdites of ferrous metals whose ions are soluble in aqueous ammonia in amount greater than that required to precipitate the metal ion. Examples of such mixtures of ferrous group metal molybdites are nickel and cobalt molybdites. These are much less preferred because of the efficiency of the decarbonylation reaction is much lower than it is with the aforementioned non-ferrous group metal molybdites.

The amount of catalyst employed depends upon such interdependent variables as temperature, pressure, mode of operation, feed rate, etc. In general the amount of catalyst used is that required to bring about reaction at a suitable rate under the conditions used. In a batch operation the amount will vary from about 0.01 to about 20% by weight of furfural being decarbonylated. In continuous operation the weight of furfural decarbonylated at any given instant is less than the weight of catalyst, but the total weight of furfural which may be decarbonylated during the active life of the catalyst is at least 10 times the catalyst weight.

The decarbonylation process of this invention is carried out at ordinary atmospheric pressure and this has a marked practical advantage from the standpoint of ease of operation, simplicity of equipment requirements, etc. If desired, however, the process can be operated at subatmospheric pressure or at superatmospheric pressures of up to 100 or more pounds per square inch.

As a rule the process is carried out at temperatures of from 350° to 500° C. Since the best yields of desired products are obtained in the range of 400° to 475° C., this embraces the preferred temperature conditions.

Although the decarbonylation reaction can be effected by contacting the furfural alone with the catalyst, usually better results from the standpoint of yield of desired product and life of the catalyst are obtained by employing water in conjunction with the furfural. Good results are obtained using as little as one mole of water per mole of furfural but better yields, with greater freedom from side reaction products, result if the amount of water is at least 5 moles per mole of furfural. If desired, an inert diluent gas such as nitrogen can be employed in conjunction with the furfural.

Feed-rate is an important variable since it determines the amount of furfural which can be processed in a unit of time through a unit volume of catalyst per hour. As a rule the feed-rate will vary from 2 to 500 gram-moles of vapor per liter of catalyst per hour. The best results are obtained using a feed-rate of from 20 to 70 gram-moles of vapor per liter of catalyst per hour and this constitutes a preferred condition.

The decarbonylation process of this invention makes possible the obtainment of furan from furfural in good yields and with minimum of side-reaction products, which minimizes isolation and purification problems.

As many apparently widely different embodiments of this invention may be made without departing from the spirit and scope thereof, it is to be understood that this invention is not limited to the specific embodiments thereof except as defined in the appended claims.

I claim:

1. A process for decarbonylating furfural to furan which comprises contacting a mixture of furfural and water with a catalyst heated to a temperature of 350 to 500° C. and which is selected from the class consisting of non-ferrous metal molybdites and mixtures of molybdites of ferrous metals whose ions are soluble in aqueous ammonia in amount greater than that stoichiometrically required to precipitate the metal ion.

2. A process for decarbonylating furfural to furan which comprises contacting a mixture of furfural and water with a non-ferrous metal molybdite heated to a temperature of 350 to 500° C.

3. A process for decarbonylating furfural to furan which comprises contacting a mixture of furfural and water with zinc molybdite heated to a temperature of 350 to 500° C.

4. A process for decarbonylating furfural to furan which comprises contacting a mixture of furfural and water with copper molybdite heated to a temperature of 350 to 500° C.

JAMES E. CARNAHAN.

REFERENCES CITED

The following references are of record in the file of this patent:

UNITED STATES PATENTS

| Number | Name | Date |
|---|---|---|
| 2,077,421 | Lazier | Apr. 20, 1937 |
| 2,129,507 | Salzberg | Sept. 6, 1938 |
| 2,337,027 | Cass | Dec. 21, 1943 |
| 2,374,149 | Whitman | Apr. 17, 1945 |

FOREIGN PATENTS

| Number | Country | Date |
|---|---|---|
| 553,175 | Great Britain | May 11, 1943 |
| 575,362 | Great Britain | Feb. 14, 1946 |